May 16, 1950      J. C. RAWITZER      2,507,679
PRODUCE PICKER'S BAG
Filed March 23, 1946
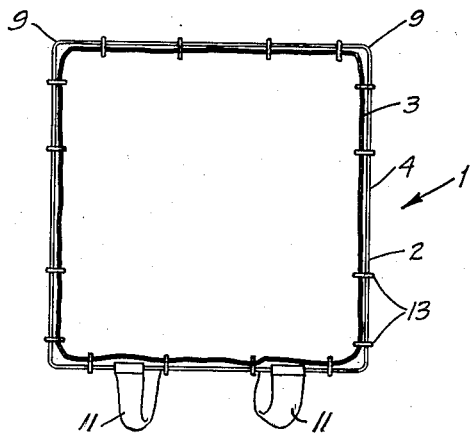
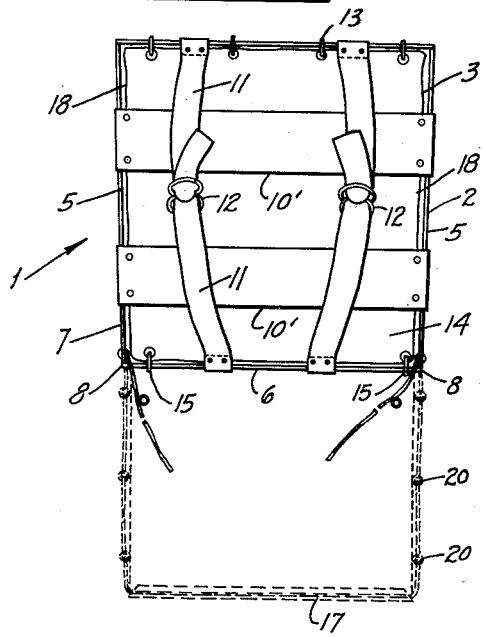
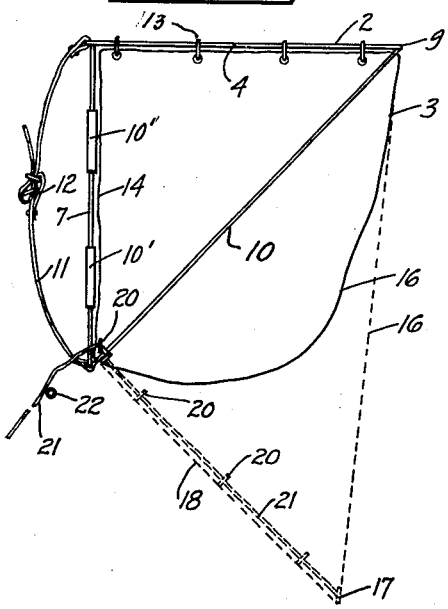
INVENTOR.
Joseph C. Rawitzer
BY
A. Schapps
ATTORNEY Patented May 16, 1950

2,507,679

UNITED STATES PATENT OFFICE 2,507,679

PRODUCE PICKER'S BAG

Joseph C. Rawitzer, Salinas, Calif.

Application March 23, 1946, Serial No. 656,697

2 Claims. (Cl. 150—2)

The present invention relates to improvements in a produce picker's bag, and has particular reference to a bag adapted for use by pickers in the harvesting of vegetables, such as broccoli, cabbage, artichokes, cauliflower, and other produce.

More particularly it is proposed to provide a bag of the character described which can be readily fastened upon the back of the picker and which leaves both hands free to pick the vegetables and to throw them over the shoulder into the bag.

It is further proposed to provide a picker's bag which will readily balance itself upon the picker's back and which presents a large and convenient entrance opening for the vegetables to pass into the bag.

It is a still further object of my invention to provide a picker's bag from which the vegetables may be readily discharged through the bottom thereof, with the picker standing in upright position.

And finally, it is proposed to provide a bag of the character described that may be easily and quickly applied, is light and open in structure, balances itself on the back of the picker when he stoops for picking the vegetables, and provides a free flow of the material therethrough when the bottom is opened for dumping the vegetables.

Further objects and advantages of my invention will appear as the specification proceeds, and the novel and interesting features of my picker's bag will be fully defined in the claims attached hereto.

The preferred form of my invention is illustrated in the accompanying drawing, forming part of this application, in which:

Figure 1 shows a top plan view of my picker's bag;

Figure 2, a front view of the same, the outline of the opened sack being shown in dotted lines; and Figure 3, a side view of my bag as shown in Figure 2.

While I have shown only the preferred form of my invention, it should be understood that various changes or modifications may be made within the scope of the claims hereto attached, without departing from the spirit of the invention.

Referring to the drawing in detail, my picker's bag 1 comprises in its principal features a preferably metal frame structure 2 and a sack 3 supported therein.

The frame structure is preferably made of hollow rods, four of which are arranged to form a horizontal frame 4 approximately twenty inches square, while two rods 5 depend vertically from the front edges of the frame 4 and are interconnected at the bottom by a third rod 6 to form a substantially square vertical front frame 7, the side rods of which may slightly taper toward one another, as shown in Figure 2 for better balance upon the back of a person.

The bottom edges of the front frame 7, indicated at 8, and the rear edges of the upper horizontal frame 4, indicated at 9, are interconnected by the bracing rods 10 arranged diagonally. This leaves an open frame structure, with the top frame free to allow the vegetables to pass and the entire space underneath the frame free to accommodate the sack 3.

The side rods 5 of the front frame are interconnected by bands 10', preferably made of canvas material, to bear against the back of the person. Any other suitable means may be employed as a cushioning means for the back of the person.

The top and bottom members of the front frame have suitable shoulder straps 11 secured thereto and these straps are buckled, as at 12, for adjustment to the size of the person. The frame may thus be readily secured upon the back of the picker, who merely slips his arms through the shoulder straps.

The sack 3 is preferably square in cross-section and of substantially the same size as the top frame. It is suspended from the top frame by means of a number of rings 13 for which purpose nose rings commonly used for hogs are particularly well adapted.

The sack 3 is preferably made of substantial canvas material. Its front wall 14 is of practically the same dimensions as the front frame 7 and its lower edge is secured upon the bottom member 6 of the front frame by means of nose rings, indicated at 15.

The rear wall 16 of the sack is considerably longer than the front wall so as to extend below the same when freely suspended, as shown in dotted lines in Figure 3. The bottom edge of the rear wall is reinforced by a strip 17 of wood or similar rigid material, extending through the length thereof.

The side walls 18 of the sack connect the front and rear walls, and the bottom edges 19 taper, as shown in Figure 3, to connect the bottom edges of the front and rear walls respectively.

The bottom edges of the sides have a number of rings 20, and a cord 21 is guided past the wood strip 17 and through the rings for tying upon the stomach region of the picker.

The projecting ends of the cord may have special rings 22 tied thereinto to prevent the ends of the cord from slipping past the first rings 20 which are placed at the bottom of the front frame.

In use the picker slips his arms through the straps to secure the bag frame upon his back. He then draws in the cord 21 to pull the rear bottom edge of the sack from the dotted line position in Figures 2 and 3 to the full line position adjacent the lower front frame member 6, and ties the ends of the cord upon his stomach region.

This closes the bottom of the bag, as shown in full lines in Figure 3.

The picker then proceeds to gather the vegetables and tosses the same over his back into the sack, through the open top frame.

After the sack is full, the picker may then release the load by merely untying the cord, which causes the rear wall of the sack to fall away from the front wall and allows the load to be dumped through the bottom of the sack in a free fall.

I claim:

1. A produce picker's bag comprising a frame structure, means for securing the frame structure on a picker's back, with the bag mouth opening at substantially shoulder level, said frame structure including an open, rectangular, horizontal reach and an open, rectangular vertical reach, said reaches being connected by a pair of diagonally disposed bracing rods placed at the opposite side edges of the frame structure, said horizontal reach being provided with means for supporting the bag peripherally at its mouth opening, said vertical reach being provided with padding means to adapt it to the contour of a picker's back, and said bag having an open bottom which is foldable upwardly to closure position and held in this folded and closed position by readily releasable drawstring means.

2. A produce picker's bag as defined in claim 1, in which the front wall of the bag is substantially commensurate with the vertical reach while the rear wall extends downwardly beyond the front wall and side walls connect the front and rear walls to form diagonal bottom edges.

JOSEPH C. RAWITZER.

REFERENCES CITED

The following references are of record in the file of this patent:

UNITED STATES PATENTS

| Number | Name | Date |
| --- | --- | --- |
| 833,383 | Guinther | Oct. 16, 1906 |
| 976,668 | Marshburn | Nov. 22, 1910 |
| 1,192,344 | Peterson et al. | July 25, 1916 |
| 1,738,470 | Williams | Dec. 3, 1929 |
| 1,994,362 | Kavanagh | Mar. 12, 1935 |
| 2,276,087 | Petersen | Mar. 10, 1942 |
| 2,421,962 | Pearl | June 10, 1947 |

FOREIGN PATENTS

| Number | Country | Date |
| --- | --- | --- |
| 53,365 | Austria | May 10, 1912 |